United States Patent [19]

Liu

[11] Patent Number: 4,980,823
[45] Date of Patent: Dec. 25, 1990

[54] SEQUENTIAL PREFETCHING WITH DECONFIRMATION

[75] Inventor: Lishing Liu, Pleasantville, N.Y.

[73] Assignee: International Business Machines Corporation, Armonk, N.Y.

[21] Appl. No.: 463,867

[22] Filed: Jan. 5, 1990

Related U.S. Application Data

[63] Continuation of Ser. No. 65,238, Jun. 22, 1987, abandoned.

[51] Int. Cl.⁵ .................. G06F 12/02; G06F 13/00
[52] U.S. Cl. ............................ 364/200; 364/900;
364/243.4; 364/263.1; 364/243.41; 364/246.12;
364/246.13; 364/964.2; 364/948
[58] Field of Search .......................... 364/200, 900

[56] References Cited

U.S. PATENT DOCUMENTS

| 3,898,624 | 8/1975 | Tobias | 364/200 |
|---|---|---|---|
| 4,490,782 | 12/1984 | Dixon et al. | 364/200 |
| 4,755,933 | 7/1988 | Teshima et al. | 364/200 |
| 4,774,654 | 9/1988 | Pomerene et al. | 364/200 |
| 4,807,110 | 2/1989 | Pomerene et al. | 364/200 |
| 4,899,275 | 2/1990 | Sachs et al. | 364/200 |
| 4,928,239 | 5/1990 | Baum et al. | 364/200 |

OTHER PUBLICATIONS

"Simple Prefetching Scheme for Memory Hierarchy", IBM Technical Disclosure Bulletin, vol. 26, No. 1, Jun. 1983. pp. 52–54.
"Confirmed Prefetching with Confirmation on Exit", IBM Technical Disclosure Bulletin, vol. 29, No. 2, Jul. 1986, p. 911.
"Prefetch Confirmation/Access Array", IBM Technical Disclosure Bulletin, vol. 29, No. 3, Aug. 1986, p. 1380.

Primary Examiner—Michael R. Fleming
Assistant Examiner—Gopal C. Ray
Attorney, Agent, or Firm—Ronald L. Drumheller

[57] ABSTRACT

A computer memory management method for cache memory uses a deconfirmation technique to provide a simple sequential prefetching algorithm. Access sequentially is predicted based on simple histories. Each memory line in cache memory is associated with a bit in an S-vector, which is called the S-bit for the line. When the S-bit is on, sequentiality is predicted meaning that the sequentially next line is regarded as a good candidate for prefetching, if that line is not already in the cache memory. The key to the operation of the memory management method is the manipulation (turning on and off) the S-bits.

24 Claims, 13 Drawing Sheets

Cache Directory Entry

| Address | V | R | ... |

Address     Address Identification of Cache Line
V-Tag        Validity Tag
R-Tag        Reference Tag S-Vector    (History of Sequentiality)

Conceptual:    One Bit ($S_i$) per Physical Line ($L_i$)

SEQUENTIAL PREFETCHING WITH DECONFIRMATION

This is a continuation of application Ser. No. 7/065,238, filed June 22, 1987, now abandoned.

1. Field of the Invention

The present invention is generally related to computer memory management techniques and, more particularly, to a deconfirmation technique to provide a simple sequential prefetching algorithm implementation in cache memory.

2. Description of the Prior Art

Modern high-performance stored program digital computers conventionally fetch instructions from main memory and store the fetched instructions in a cache memory. A cache memory is a relatively small high speed hardware buffer that interfaces with the central processing unit (CPU) of the computer. Because an instruction in cache can be immediately accessed by the CPU, caches have been used to speed up computer performance. The basic idea is to prefetch instructions from main memory based on a prediction algorithm and store the prefetched instructions in the cache memory. When the next instruction in a sequence of instructions is required by the CPU, a determination is first made as to whether the instruction is already in cache memory (a cache hit) or not (a cache miss), and if it is, to read the instruction from cache to the CPU, otherwise to read the instruction from main memory, a process which can take several CPU cycles and significantly degrades computer performance. The goal is to make the prefetch algorithm as accurate as possible and thereby minimize cache misses without excessive prefetch traffic.

Figure 1:
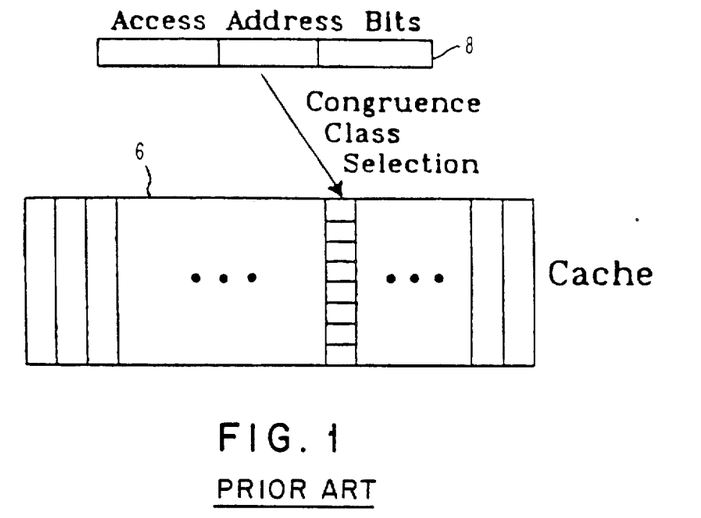
FIG. 1 is a block diagram illustrating a conventional two-dimensional organization of a chche memory showing congruence class selection.

Caches are normally organized as a two-dimensional table as illustrated in FIG. 1. Each memory access from the instruction or execution (I/E) units of the CPU is indexed to a particular column, called a congruence class, of the cache 6. Such indexing is via some fixed bits in the memory access address 8. Within each congruence class, there are a fixed number of lines in cache. The number of lines in each congruence class is called the set-associativity of the cache. Such a cache access results in a cache miss if the line is not found in the congruence class. The cache directory control manages a certain priority for each congruence class, which indicates relatively how recently each line in the congruence class was accessed. Within a congruence class, a line that was last accessed is called the MRU (Most-Recently-Used), while the line that was accessed the longest time ago is called the LRU (Least-Recently-Used). Normally, when a replacement is needed in a congruence class, as for example the insertion of a new line, the LRU entry will be selected to be replaced. Each time a line is accessed in the cache, it will be reflected properly as the MRU in its congruence class.

High speed processor performance relies heavily on a high hit ratio to cache. One way to enhance the cache hit ratio is to anticipate the access of certain lines beforehand and fetch them into the cache even before they are requested by the I/E-units. In this way, the delay cycles associated with a main memory fetch upon a cache miss will be saved or reduced. However, predicting accesses beforehand is not easy, especially when it is also desired to have higher accuracy in the prediction mechanisms.

Prefetch algorithms are generally based on observed behavior of computer programs. For example, locality is a strong property that is observed in almost all programs. It means that memory accesses tend to concentrate on relatively few data blocks during any short time interval.

The subject invention is concerned with sequential prefetching of cache lines using a prediction scheme based on a special type of locality behavior, which is referred to herein as sequentiality. Sequentiality means that, when a line is accessed by a processor, the sequentially next line tends to be, but is not always, accessed soon thereafter. Consider, for example, the set of lines in the memory ordered according to addresses into a set $\{L_i\}$. Upon an access to $L_i$, a decision may be made to prefetch $L_{i+1}$ into the cache if it is not resident there. However, it is known to be important to recognize whether a prefetched line has potential to be referenced in order to reduce penalties on traffic and cache replacements. Hence, if the physically sequential next line is prefetched into the cache upon a current access, the miss penalties associated with a main memory access may be saved if indeed the prefetched line is accessed by the I/E-units shortly afterwards. The subject invention is specifically directed to ways of improving the prediction accuracy and realizing the improved accuracy in practice.

SUMMARY OF THE INVENTION

It is therefore an object of this invention to provide a technique for sequential prefetching of instructions in a stored program digital computer with substantial cache miss reduction and high prefetch accuracy thereby improving the performance of the computer.

It is another object of the present invention to provide an inexpensive and easily implemented instruction prefetch technique which accurately predicts access sequentiality based on simple histories.

According to the invention, a simple prefetching algorithm is implemented using deconfirmation techniques. The basic concept of the invention is illustrated for sequential prefetching of instruction lines (I-lines). First, consider a bit (R-bit) per cache line entry, which indicates whether the current line at the entry has actually been accessed. For each memory line $L_i$, an S-bit ($S_i$) indicates whether prefetching of $L_{i+1}$ should be considered when $L_i$ is accessed. Initially, all S-bits and R-bits are turned on. When a line is actually accessed, which may cause a miss itself, the R-bit of the entry will be turned on. The R-bit is turned off when a prefetched line is just brought into the entry. Upon an access, e.g., from the I/E-units, to a non-MRU line, say, $L_i$, a decision is made to prefetch $L_{i+1}$ into the cache when $S_i$ is one, if $L_{i+1}$ is not resident there. When a line $L_{i+1}$ is moved out of the cache, e.g., due to replacement or other reasons, a check is made to determine whether the R-bit for the replaced line is off. If so, $S_i$ is turned off to deconfirm the sequentiality. The basic concept may be modified in various ways, including the elimination of the R-bits.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

Figure 1A:
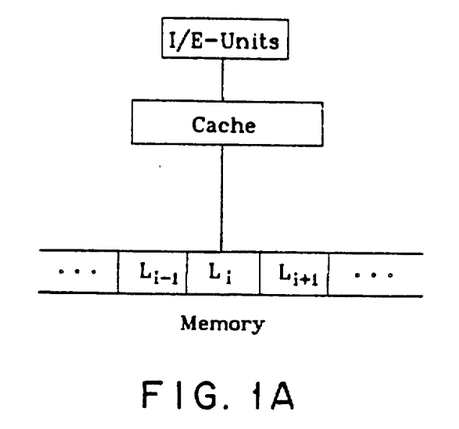
FIG. 1A is a block diagram illustrating a conceptual picture of memory as consecutive blocks or lines.

In the cache management scheme according to the invention, the memory, as illustrated in FIG. 1A, is viewed as consecutive blocks or lines . . . $L_{i-1}$, $L_i$, $L_{i+1}$ . . . The goal is to prefetch the sequential next line into cache. The approach taken by the invention is to provide one bit per line, referred to as the S-bit, as a sequentiality flag and to manage the sequentiality flags by deconfirmation.

Figure 2:
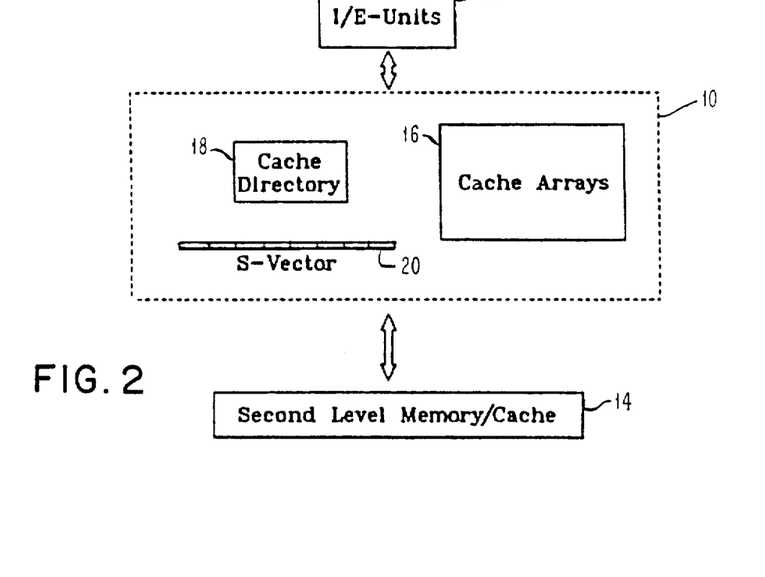
FIG. 2 is a block diagram showing the modification to cache memory control to include an S-vector.

Referring now to FIG. 2 of the drawings, there is shown a high level block diagram illustrating the architecture of the cache memory 10 according to the subject invention. The cache memory 10 is interposed between the I/E-units 12 and a second level memory or cache 14. The second level memory may, in the simplest case, be the main memory, but in more complex systems, it may be another level of cache memory. In any case, the memory 14 is a relatively slower memory than the cache memory 10. Cache memory 10 includes cache arrays 16, corresponding to the cache 6 shown in FIG. 1, and a cache directory 18 containing the access address bits 8 shown in FIG. 1. The present invention adds an S-vector 20 which is used in the deconfirmation algorithm implemented by the invention.

Figure 3:
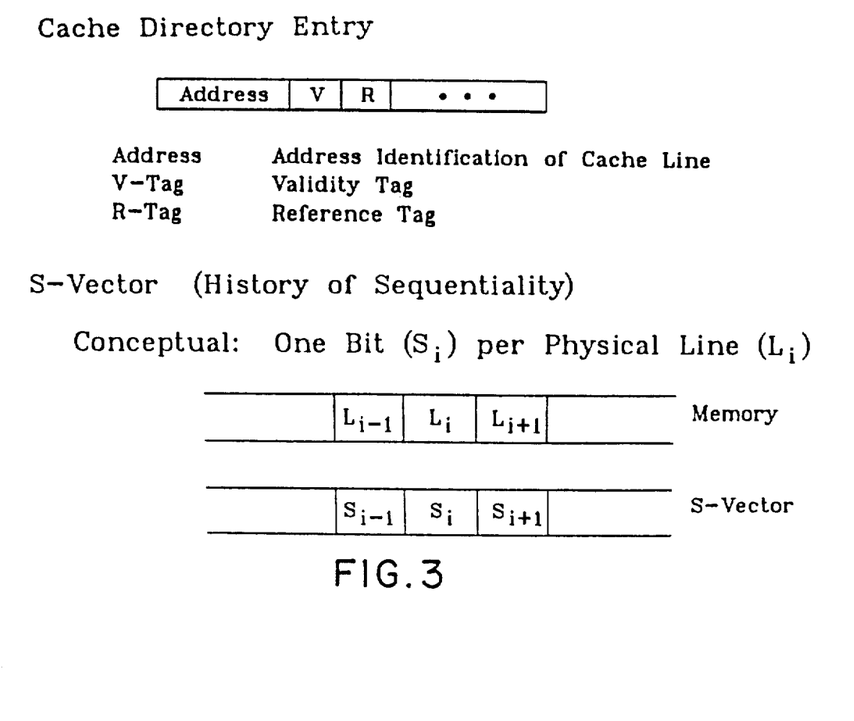
FIG. 3 is a bit map showing the cache directory entry and the relationship of the S-vector to lines the cache memory.

FIG. 3 shows the cache directory entry as comprising an address which identifies a particular line in the cache array 16, a validity tag (V-tag), and a reference tag (R-tag), as well as other bits which are not pertinent to the subject invention. The R-tag or R-bit as used in this invention is to be distinguished from a memory reference bit which may be architecturally defined. According to the present invention, the R-bits are used to help manipulate the S-bit histories, but as will be made clear hereinafter, the prefetching mechanism according to the invention may be implemented without using R-bits in the cache directory. The S-vector is composed of a plurality of bits equal in number to the number of lines in the main memory, there being one bit, $S_i$, per physical line, $L_i$, of the main memory. As will become clear from the following description, the S-vector provides a history of sequentiality of the lines in the cache array.

Figure 4:
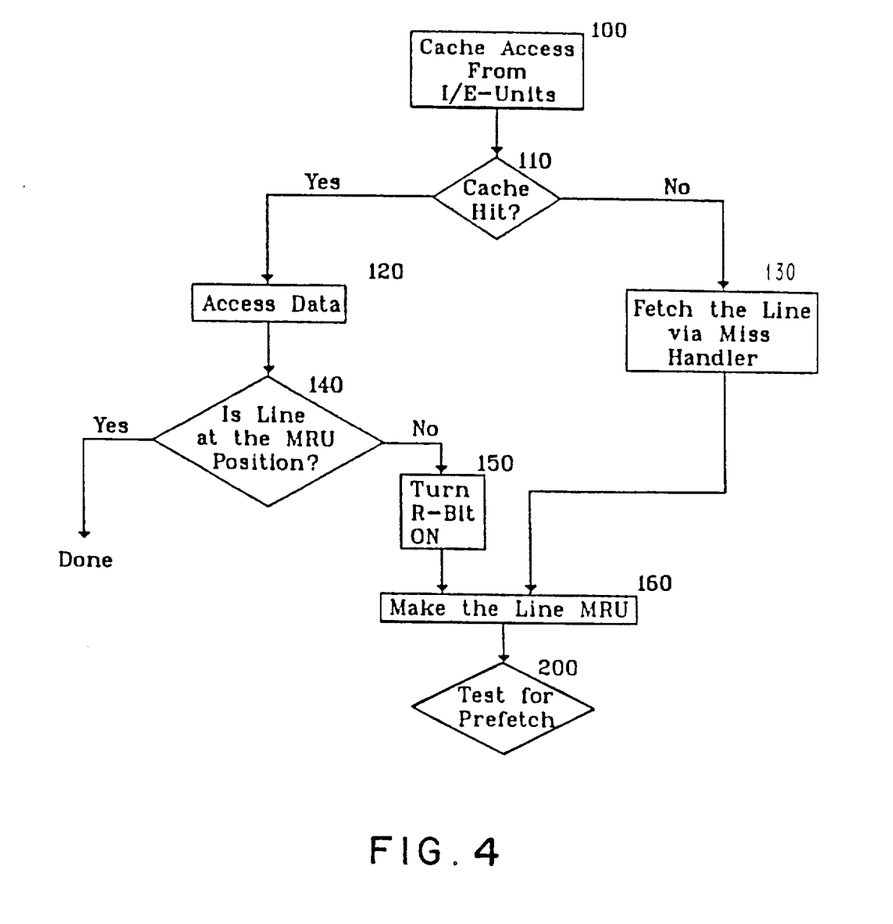
FIG. 4 is a flow diagram showing the basic cache access logic according to the invention.

The basic cache access flow diagram is shown in FIG. 4. Initially, the cache is empty, all V-bits are off, and all S-bits are on. The flow diagram is entered at block 100 when there is a cache access from the I/E-units. In decision block 110, a test is made to determine if there is a cache hit. Assuming the initial condition that the cache is empty, there will be a cache miss so the control branches to function block 130 where the requested line is fetched from main memory via the miss handler. This line is made the MRU line in function block 160, and in decision block 200, a test is made for prefetch. This test will be described in more detail in connection with the description of FIG. 5.

Assume on the other hand that the test in decision block 110 is positive; i.e., there is a cache hit. In that case, the line in cache is accessed in function block 120 and data sent directly to the requesting I/E-units. A test is also made in decision block 140 to determine if the line accessed is at the MRU position of the cache. If it is, the cache access procedure is completed; otherwise, the R-bit is turned on in function block 150, and the line is made the MRU line in function block 160.

Figure 5:
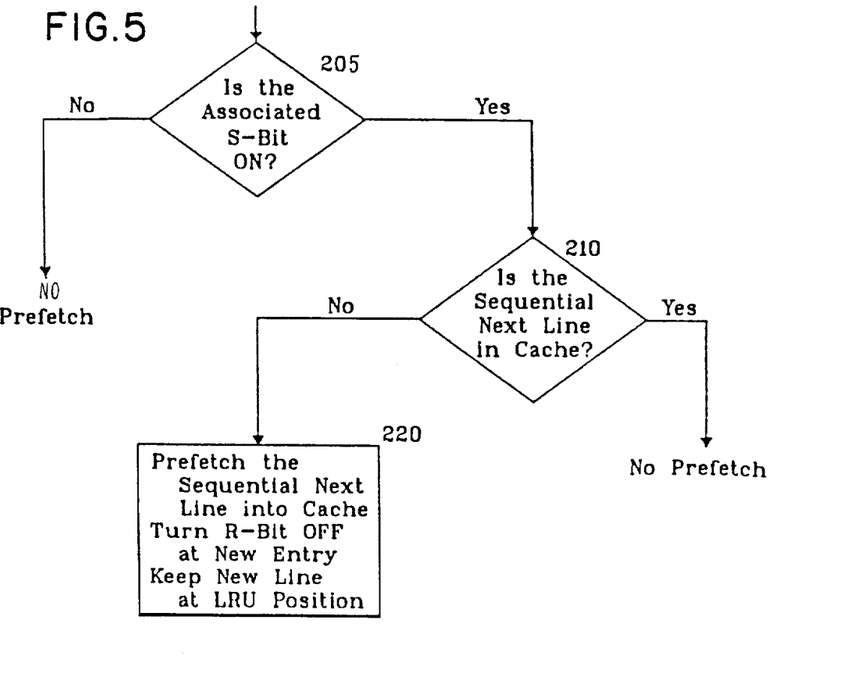
FIG. 5 is a flow diagram showing the decision logic of prefetching used in the cache access logic of FIG. 4.

FIG. 5 shows the flow diagram for the test for prefetch. This flow diagram is entered at decision block 205 by testing the S-bit associated with the line to see if it is on. If not, there is no prefetch. If the S-bit is on, then a test is made in decision block 210 to determine if the sequential next line is presently in the cache. If it is, there is no prefetch. However, if the sequential next line is not presently in cache, it is prefetched into cache in function block 220 replacing the LRU entry in its associated congruence class. At the same time, the R-bit is turned off at the new entry, and the new line is kept at the LRU position in the cache.

Figure 6:
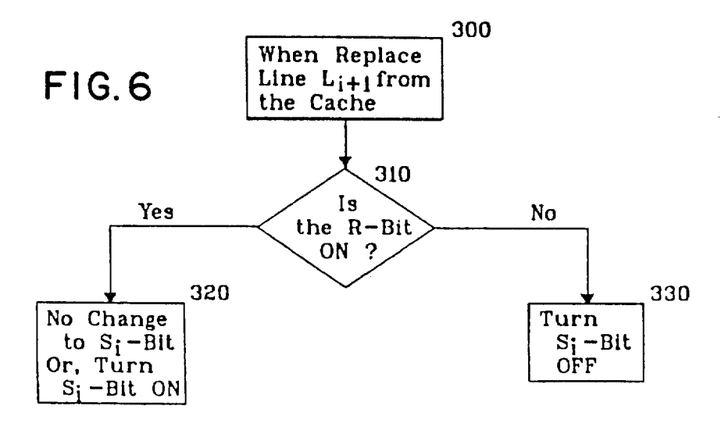
FIG. 6 is a flow diagram showing logic for resetting the S-bits of the S-vector according to the invention.

Key to the operation of the invention is the management of the S-bits which comprise the S-vector. The flow diagram illustrating the basic scheme for resetting of the S-bits is shown in FIG. 6. The flow diagram is entered at function block 300 when line $L_{i+1}$ from the cache is replaced. A test is made in decision block 310 to determine if the R-bit for the line is on. If it is, then there is no change to the $S_i$-bit or the $S_i$-bit is turned on, depending on design choice. On the other hand, if the R-bit is not on, the $S_i$-bit is turned off.

Figure 7:
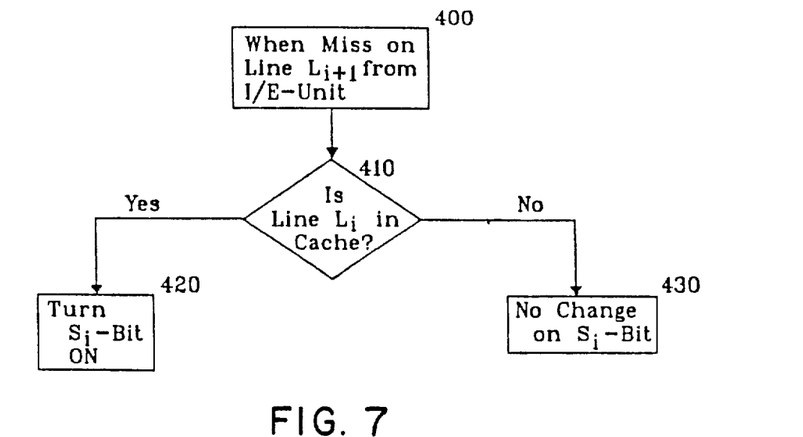
FIG. 7 a flow diagram showing an alternative logic for resetting the S-bits of the S-vector according to the invention.

An alternative to the resetting of the S-bits is shown in the flow diagram of FIG. 7. This flow diagram is entered at function block 400 when a miss occurs on line $L_{i+1}$ accessed from the I/E-units. A test is made in decision block 410 to determine if line $L_i$ is in the cache. If it is, the $S_i$-bit is turned on in function block 420, but if it is not, there is no change to the $S_i$-bit in function block 430.

Figure 8:
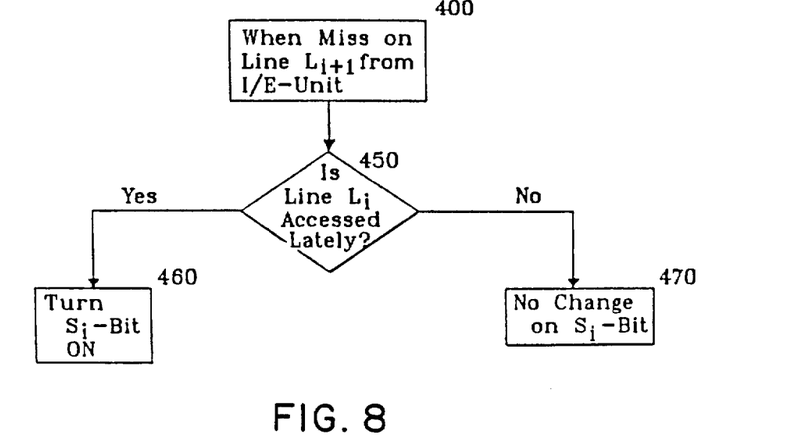
FIG. 8 is a flow diagram showing another alternative logic for resetting the S-bits of the S-vector according to the invention.

A second alternative to the resetting of the S-bits is shown in FIG. 8. In this case, a test is made in decision block 450 to determine if the line $L_i$ has been accessed lately. If it has, the $S_i$-bit is turned on in function block 460; function block 470.

Figure 9:
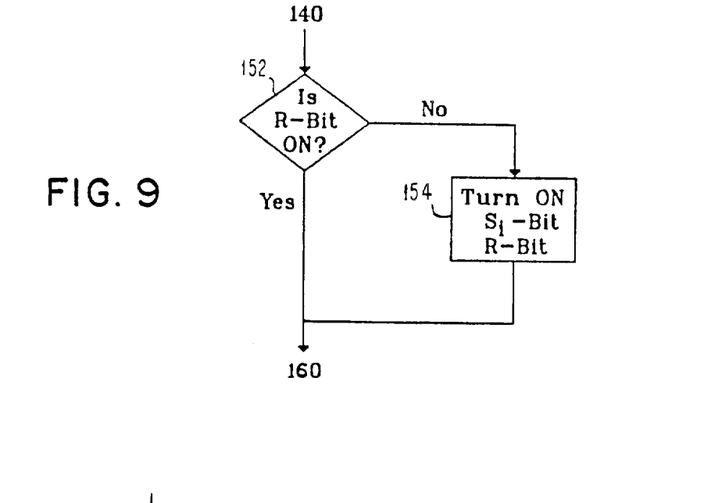
FIG. 9 is a flow diagram showing a modification to the basic cache access logic shown in FIG. 4.

Returning briefly to FIG. 4, the basic cache access procedure may be modified by replacing function block 150 with the flow diagram shown in FIG. 9. More specifically, upon accessing $L_{i+1}$, a negative test output from decision block 140 is followed by a test in decision block 152 to determine if the R-bit is on. If it is, flow goes to function block 160 as before; otherewise, the R-bit and the $S_i$-bit are both turned on in function block 154 to confirm the sequentiality momentarily. When sequentiality of a prefetched line is detected again by the test in decision block 152, the S-bit will be again turned on.

Figure 10:
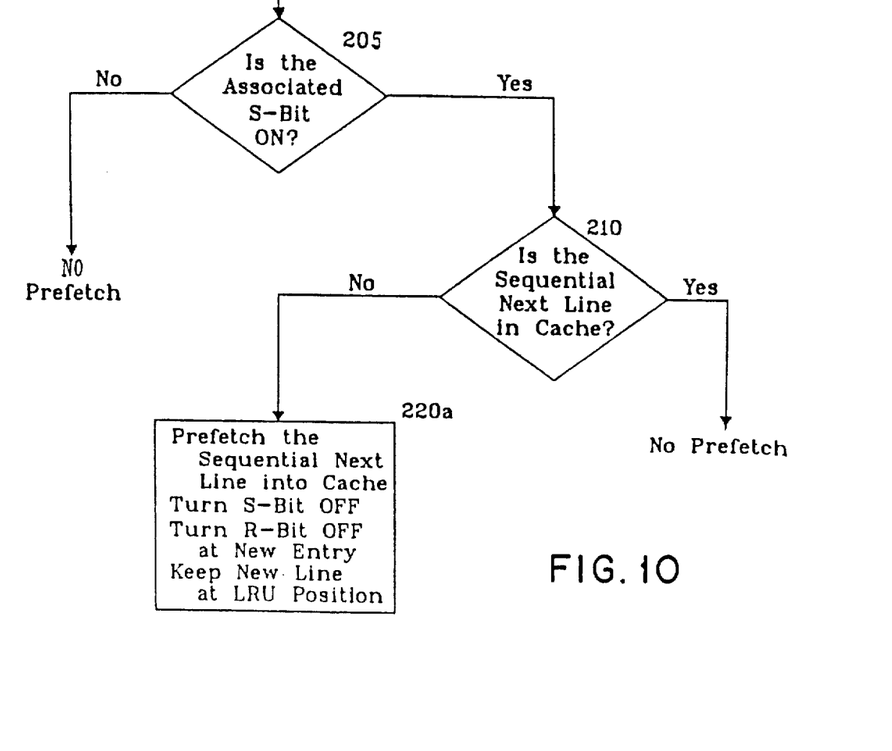
FIG. 10 is a flow diagram showing an alternative decision logic of prefetching for use with the modified basic cache access shown in the flow diagram of FIG. 9.

FIG. 10 shows a modification to the decision of prefetching shown in FIG. 5 for use with the modification to the basic cache access logic shown in FIG. 9. This modification changes function block 220 to 220a where the sequential next line is prefetched into cache as before, but in addition to turning the R-bit off at the new entry and keeping the new line at the LRU position, the S-bit is also turned off.

Figure 11:
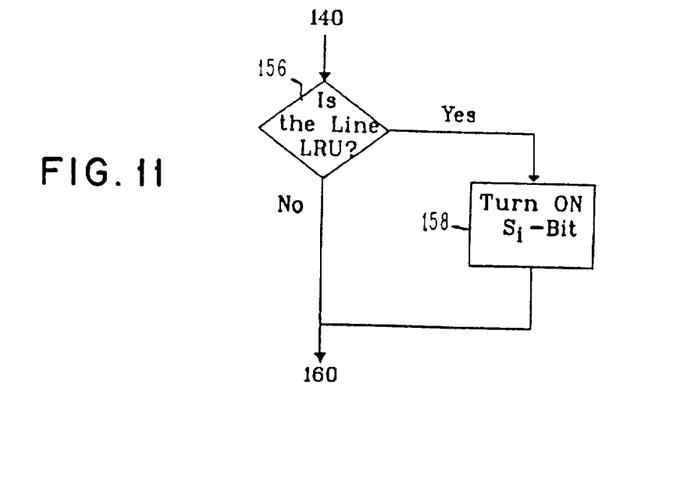
FIG. 11 is a flow diagram showing another modification to the basic cache access logic of FIG. 4 which no R-bits.
Figure 12:
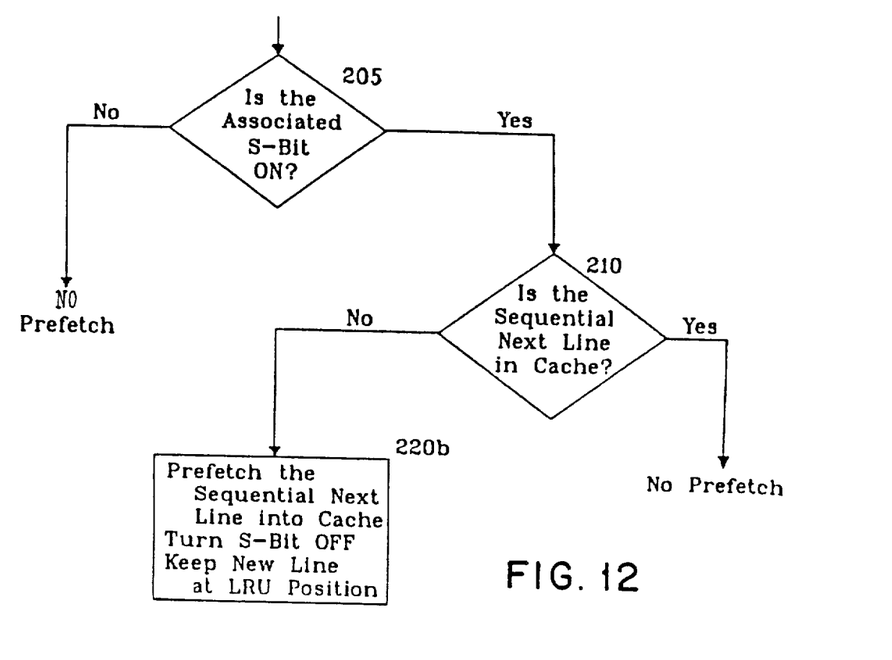
FIG. 12 a flow diagram of the decision logic of prefetching for use with the modified basic cache access logic shown in FIG. 11 using no R-bits.

It is possible to operate the invention with no R-bits, and the modifications needed for this case are shown in FIGS. 11 and 12. FIG. 11 is a modification of the basic cache access flow diagram shown in FIG. 4 and, like FIG. 9, represents a replacement for the function block 150. In this case, a test is made in decision block 156 to determine if the line is at the LRU position in cache. If not, control passes to function block 160 as before; otherwise, the $S_i$-bit is turned on in function block 158 before control passes to function block 160.

FIG. 12 shows the modification of the decision of prefetching with no R-bits and represents a modification of the flow diagram shown in FIG. 5. In this case, function block 220 is replaced by function block 220b where instead of turning the R-bit off at the new entry, the S-bit is turned off.

Through experiments, it was found highly desirable to prefetch instruction lines into LRU positions of a cache congruence class, instead of at the MRU position. In this case, the turning on of R-bits is practically not necessary when non-LRU lines are accessed.

It is possible to turn the S-bits back on when sequentiality is detected again. One way, referred to as the Strong Sequentiality Test, is to turn $S_i$ on when a cache miss of $L_{i+1}$ occurs when $L_i$ is found to be still in cache. This is shown in FIG. 7. Another alternative is to turn $S_i$ on when a cache miss of $L_{i+1}$ occurs when the previous access was found to be on $L_i$, as shown in FIG. 8.

An S-bit need not correspond to just one line in the memory. The trade off is between Directory space and performance. The S-bits may be implemented through a separate directory or table. The requirement is that, for any given line address, a fixed coordinate of a bit should be identified to record and test sequentiality.

The R-bits need not be physically located at the cache directory itself. When prefetches are to LRU positions, it is not necessary to associate an R-bit per cache line entry. In this case, only an R-bit per congruence class is needed, corresponding to the referenced status for the LRU positioned line. The R-bit of a congruence class is turned off only when a line is prefetched into the LRU position of the congruence class. The R-bit of the congruence class is turned on whenever the LRU line in it is actually accessed. When a line is moved out of the cache, the S-bit associated with its sequential predecessor is turned off if it is detected that the R-bit of the corresponding congruence class is still off and the R-bit is turned on after the detection. This is shown in the implementation of the base algorithm of the flow diagram in FIG. 6. The R-bit vector does not need to be located physically at the cache directory and may be associated at the prefetch control. Communications between the cache directory control and the prefetching control can be implemented with rather simple signals.

In order to simplify control and communication, it may be beneficial, upon an access of $L_i$, to turn $S_i$ off when $L_{i+1}$ is determined to be prefetched. Such $S_i$ is turned on when the prefetched $L_{i+1}$ is actually accessed the first time with the associated R-bit off. This R-bit should be turned on afterwards. In this way, it is not necessary to send the address of a replaced line to the prefetch control to find the proper S-bit to turn on or off.

Sequential prefetch testing, and other associated operations, may be done upon an access of a cache line only when the R-bit for the sequential next line is on. This will reduce many redundant re-testing of prefetching conditions. It is also possible, when the prefetching control tends to cause contention, to perform prefetching only upon cache misses.

It is possible to combine other prefetching schemes with the invention. For instance, it was found to be useful to improve prefetch accuracy to prefetch the next line (when the S-bit is on) only when the currently accessed word is within the last ¼ portion of the line.

In the above, what has been considered is pure LRU replacements in which an LRU line stays LRU until it is referenced or replaced. For PLRU (Partitioned LRU) replacements, it is possible to use an extra bit per congruence class for the R-vector to record the exact coordinate of the prefetched lines.

The central idea of the invention is to predict access sequentiality based on simple histories. Intuitively, the history will show the benefit of sequentiality for a line $L_i$ if the sequential next line $L_{i+1}$ was found to be active when $L_i$ was accessed the previous time. The S-vector is for the recording of such histories. Each memory line is associated with a bit in the S-vector, which is called the S-bit of the line. When the S-bit is on, sequentiality is predicted meaning that the sequentially next line is regarded as a good candidate for prefetching, if it is not already in the cache. The key to the operation of the invention is the manipulation (turning on and off) of the S-bits. The base algorithm shown in FIG. 6 shows how this manipulation is accomplished. FIGS. 7 and 8 show alternatives to the base algorithm.

Performance studies have shown that the invention can save 39–52% of I-cache misses with an accuracy from 79% to over 94%

The invention has been described for the sequential prefetching of I-lines. The teachings of the invention may be applied to various cache organizations and for sequential prefetching of different line types. Therefore, those skilled in the art will recognize that the invention may be practiced with modification and in various environments within the spirit and scope of the appended claims.

Having thus described by invention, what I claim as new and desire to secure by Letters Patent is as follows:

1. A computer performed method for prefetching sequential lines from main memory into a processor cache memory of a computer, said cache memory including an S-vector comprising an S-bit associated with lines in main memory, said S-b being indicative of whether a succeeding line is likely to be accessed when a line in memory corresponding to said S-bit is accessed, the S-bits of said S-vector initially being set on, said method comprising the steps of:

testing an access to the cache memory to determine if an accessed line is in the cache memory, and if it is, accessing the line;

otherwise, fetching the accessed line from main memory;

testing the accessed line in the cache memory to determine if it is in a Most-Recently-Used position, and if it is not, making the line the Most-Recently Used;

testing said S-bit for the accessed line to determine if it is on, and if it is, testing to determine if a sequential next line is in the cache memory; and if said sequential next line is not in the cache memory, prefetching the sequential next line into the cache memory as a new line and keeping the new line at a Least-Recently-Used position in the cache memory.

2. The method of prefetching lines into a cache memory as recited in claim 1 wherein an R-bit is associated with each cache line entry, said R-bit being indicative of whether the current line at entry has actually been accessed, said R-bit initially being set on, said method further comprising the step of:

when said sequential next line is prefetched into the cache memory as a new line, turning said R-bit off at said new line.

3. The method of prefetching lines into a cache memory as recited in claim 2 further comprising the step of turning said R-bit on when accessing a line in the cache memory in a non-Most-Recently-Used position.

4. The method of prefetching lines into a cache memory as recited in claim 3 wherein when a line is replaced from the cache memory, further comprising the steps of testing the R-bit to determine if it is on, and if it is not, turning the S-bit for a next preceding line in the cache memory off.

5. The method of prefetching lines into a cache memory as recited in claim 3 wherein when there is a miss on a line on an access to the cache memory, further comprising the steps of testing to determine if a preceding line is in the cache memory, and if it is, turning the S-bit for the preceding line on.

6. The method of prefetching lines into a cache memory as recited in claim 3 wherein when there is a miss on a line on an access to the cache memory, further comprising the steps of testing a preceding line in the cache memory to determine if it has been accessed lately, and if it has, turning the S-bit on for the preceding line.

7. The method of prefetching lines into a cache memory as recited in claim 2 wherein when said new line is prefetched into the cache memory, performing the following additional steps of testing the R-bit for the new line to determine if it is on, and if it is not, turning said S-bit on for the preceding line and turning said R-bit on for the new line.

8. The method of prefetching lines into a cache memory as recited in claim 7 wherein when said line is prefetched into the cache memory, further comprising the step of turning the S-bit off for the preceding line and the R-bit off at the new entry of the cache memory.

9. The method of prefetching lines into a cache memory as recited in claim 1 wherein when said new line is prefetched into the cache memory, performing the following additional steps of testing to determine if the line is in the Least-Recently-Used position, and if it is, turning the S-bit for the line on.

10. The method of prefetching lines into a cache memory as recited in claim 9 wherein when said next sequential line is prefetched into the cache memory, preforming the additional step of turning the S-bit off for that line.

11. In a computer system having a processor, a memory for storing a plurality of storage lines for use by said processor, and a cache for holding storage lines received from said memory for use by said processor, prefetching apparatus comprising:

means for storing a plurality of S-bits, each storage line in said memory corresponding with one of said S-bits, each S-bit having first and second alternate states, said first alternate state indicating that when a corresponding storage line is accessed by said processor, the next sequential storage line also is likely to be accessed soon by said processor, and said second alternate state indicating that when a corresponding storage line is accessed by said processor, the next sequential storage line is not likely to be accessed soon by said processor;

means for determining whether the S-bit corresponding with a storage line accessed by said processor is in said first state;

means responsive to said S-bit state determining means for prefetching into said cache the next sequential storage line when said S-bit is in said first state unless said next sequential storage line is already in said cache;

deconfirmation means for determining whether said prefetched next sequential storage line was accessed by said processor before it was replaced in said cache; and means responsive to said deconfirmation means for setting the state of the S-bit corresponding with the storage line preceding said prefetched next sequential storage line to said second state in the event that said deconfirmation means determines that said prefetched next sequential storage line was not accessed by said processor before it was replaced in said cache.

12. Prefetching apparatus as defined in claim 11 wherein all S-bits are initially set to said first state.

13. Prefetching apparatus as defined in claim 11 wherein all S-bits are initially set to said second state.

14. Prefetching apparatus as defined in claim 11 and further comprising means for determining upon a cache miss, whether the next preceding sequential storage line is stored in said cache, and if said next preceeding sequential storage line is stored in said cache, setting the S-bit corresponding to said next preceeding sequential storage line to said first state.

15. Prefetching apparatus as defined in claim 11 wherein each storage line in said memory corresponds uniquely with an individual S-bit.

16. Prefetching apparatus as defined in claim 11 wherein each S-bit corresponds with more than one storage line in said memory.

17. Prefetching apparatus as defined in claim 11 wherein the state of the S-bit corresponding with a storage line accessed by said processor is determined by said S-bit state determining means when said storage line is fetched into said cache in response to a cache miss.

18. Prefetching apparatus as defined in claim 11 wherein the state of the S-bit corresponding with a storage line accessed by said processor is determined by said S-bit state determining means what said processor accesses a new storage line different from the storage line previously accessed by said processor.

19. Prefetching apparatus as defined in claim 11 wherein prefetched storage lines are brought into said cache into a least recently used (LRU) position.

20. Prefetching apparatus as defined in claim 11 wherein said deconfirmation means comprises:
   means for storing an R-bit corresponding with each prefetched next sequential storage line;
   means for setting said corresponding R-bit to a first state when said prefetched next sequential storage line is prefetched; and
   means for setting said corresponding R-bit to a second state if said processor accesses said prefetched next sequential storage line.

21. Prefetching apparatus as defined in claim 20 wherein upon replacement of a storage line in said cache when the R-bit corresponding to said replaced storage line is in said first state, the S-bit corresponding with the storage line sequentially next preceeding said replaced storage line is set to said second state.

22. Prefetching apparatus as defined in claim 11 wherein upon a cache miss:
   the S-bit corresponding with the storage line brought into said cache is set to said second state, and
   if said S-bit was previously thereto in said first state, the next sequential storage line is prefetched into said cache.

23. Prefetching apparatus as defined in claim 22 wherein said S-bit corresponding with said storage line brought into said cache in response to a cache miss is reset back to said first state if said prefetched next sequential storage line is accessed by said processor before said prefetched next sequential storage line is replaced in said cache.

24. Prefetching apparatus as defined in claim 22 wherein prefetched storage lines are brought into said cache into an LRU position, and
   wherein upon an access by said processor to a storage line in an LRU position in said cache,
   said deconfirmation means determines whether the next preceeding sequential storage line is also stored in said cache, and
   if said next preceeding sequential storage line is also stored in said cache, said changing means sets the S-bit corresponding with said next preceeding sequential storage line to said first state.

* * * * *